No. 686,813. Patented Nov. 19, 1901.
W. A. LEARNED.
GAS PURIFYING BOX.
(Application filed Mar. 16, 1901.)
(No Model.)
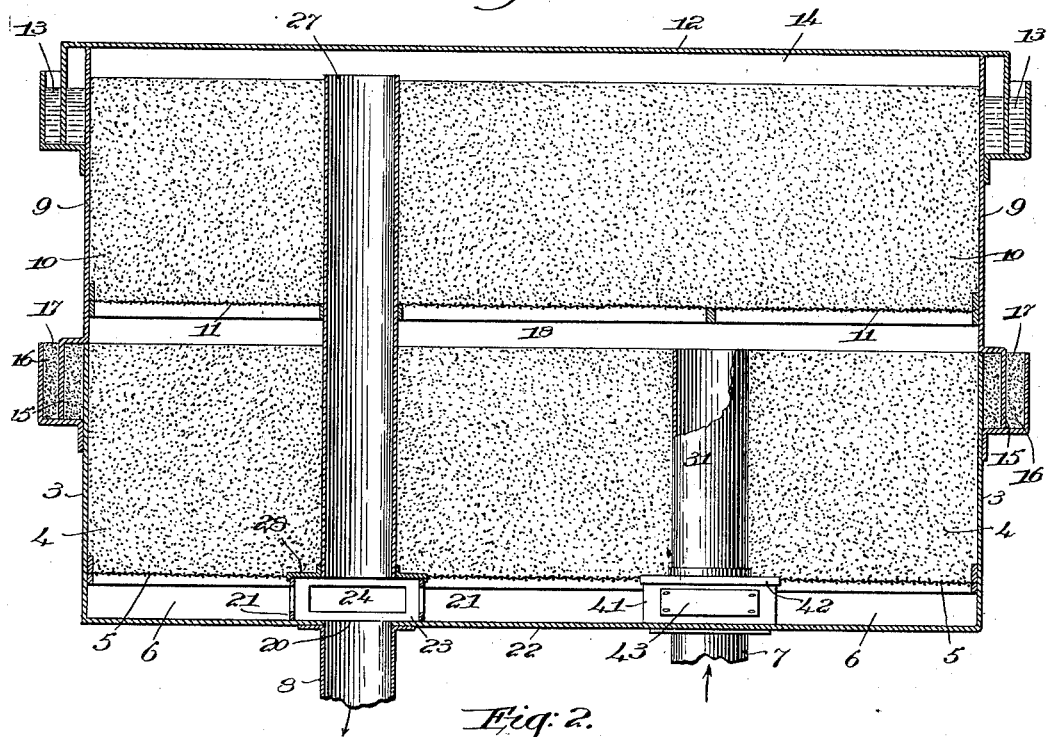
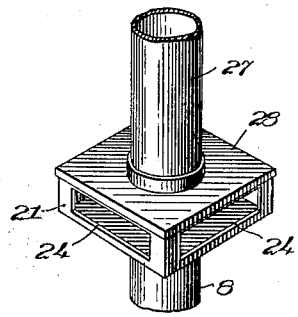
Witnesses,
Edward F. Allen.
Thomas J. Drummond.
Inventor,
Waldo A. Learned,
by Bradley Gregory,
attys.

UNITED STATES PATENT OFFICE.

WALDO A. LEARNED, OF WATERTOWN, MASSACHUSETTS.

GAS-PURIFYING BOX.

SPECIFICATION forming part of Letters Patent No. 686,813, dated November 19, 1901.

Application filed March 16, 1901. Serial No. 51,545. (No model.)

*To all whom it may concern:*

Be it known that I, WALDO A. LEARNED, a citizen of the United States, and a resident of Watertown, county of Middlesex, State of Massachusetts, have invented an Improvement in Gas-Purifying Boxes, of which the following description, in connection with the accompanying drawings, is a specification, like numerals on the drawings representing like parts.

One ordinary form of dry-gas purifier comprises a suitable box in which is a tray or screen situated a slight distance above the bottom of the box to form a chamber between the screen and the box-bottom, the said screen sustaining a bed of suitable purifying material and a suitable cover having a water-seal connection with the box. An inlet-pipe enters through the bottom of the box and delivers the gas into the space between the bed of the purifying material and the box-bottom, and an outlet-pipe is connected with the bottom of the box and communicates with the chamber between the cover and top of purifying material. The gas passes in through the inlet into the lower chamber and in passing through the bed of purifying material to the outlet is purified. This form of purifier, however, is limited in capacity; and it is the object of my present invention to provide a novel form of gas-purifying box which has double the capacity of the ordinary form now in use and which includes in its construction the ordinary form of gas-box, to which is added a supplemental box-section.

The invention comprises a box having two box-sections superimposed one on the other, the lower box-section being made similar to the ordinary form of gas-purifying box and the upper box-section containing also a bed of purifying material suitably supported upon suitable screens or trays, the said trays being so positioned as to leave a chamber or space between the same and the bed of purifying material in the lower box-section. A suitable cover is placed on the top box-section, said cover having the usual water-seal connection with the box, and a single inlet-pipe connected to the bottom of the lower box-section passes up through the lower bed of purifying material and delivers the gas to the chamber between the said beds. The outlet, which is also connected to the bottom of the lower box-section, has communication with both the lower and the upper chambers, so that the gas in passing through the box is delivered to the chamber between the two beds of material, and a portion of the gas passes through the upper bed and down through the outlet-pipe, while the rest of the gas passes through the lower bed and thence out through the outlet. The construction is also so made that, if desired, the gas may be delivered to the space or chamber between the lower bed of purifying material and the bottom of the box and be compelled to pass through the two beds of material in succession, thereby obtaining a double purification.

In the drawings, Figure 1 is a vertical section of my improved purification-box, and Fig. 2 is a detail hereinafter referred to.

One ordinary form of dry-gas purifier comprises the box 3, in which a bed 4 of purifying material is supported on suitable screens or trays 5, the said screens being so situated as to leave a chamber or space 6 between the bottom of the box and the screen. The inlet-pipe 7 enters the bottom of the box and delivers the gas to the chamber or space between the bed of purifying material and the bottom of the box, the gas passing down through the bed of material and out through an outlet-pipe 8, which communicates with the chamber at the top of the purifying-bed. My invention contemplates taking this old form of purifying-box and adding to it a supplemental box-section 9, which contains a bed 10 of purifying material, supported on suitable screens 11. A suitable cover 12 is employed having the usual water-seal connection 13 with the box to prevent the escape of gas, there being a chamber or space 14 between the cover 12 and the upper bed 10 of purifying material. In order to make a tight joint between the upper box-section 9 and the lower box-section 3, the upper box-section is cast with an offset depending flange 15 at its lower edge, the said flange being received in the annular chamber 16, which chamber when the box 3 was used in the old way was adapted to be filled with water and contained the flange upon the cover to form the ordinary water seal. The space in the chamber 16 surrounding the flange 15 will be filled with any suitable cement, as 17, to make a tight joint. The inlet-pipe 7, which enters the bottom of the box-section 3, passes up through the bed of purifying material 4 contained therein, as in the ordinary construction, and terminates so as to deliver the incoming gas into the central chamber 18 between the two beds of purifying material. The gas from the chamber 18 passes through both beds of purifying material 4 and 10 and accumulates in the upper and lower chambers 14 and 6, respectively, and to allow the escape of gas from both chambers I provide the outlet-pipe 8 with a communication with each chamber by the following means: Surrounding the outlet-opening 20 through the bottom of the box-section 3 are the vertical flanges 21, which are rigid with the bottom 22 of the box, the said flanges inclosing a chamber 23 and each being provided with a suitable opening 24, which communicates with the lower chamber 6 of the purifying-box. A pipe-section 27, which terminates at its upper end in the upper chamber 14, passes down through both beds of purifying material and is provided at its lower end with the flanged portion 28, which rests upon the vertical flange 21 and serves as a cover for the chamber 23. With this construction it will be seen that the purified gas which accumulates in the upper chamber 14 or the lower chamber 6 will escape through the outlet-pipe 8, the gas in the lower chamber 6 escaping through the ports or openings 24 and the gas in the upper chamber passing down through the conduit or pipe 27.

It will be obvious that since two beds of purifying material are employed that the purifying-box will have double the capacity that it would if only one bed of purifying material were used, and by means of my invention in the construction of a purifying-box having this added capacity it is possible to utilize the old or ordinary form of purifying-box now in general use by merely adding to the same a supplemental box-section and arranging the double outlet as above described.

It is sometimes desirable to pass the gas through both beds of purifying material, and to accomplish this I preferably connect the extended portion 31 of the inlet-pipe 7 to the box-bottom 22 by the same means that the portion 27 of the outlet-pipe is connected thereto—that is, the partitions 41, surrounding the opening of the inlet-pipe through the bottom 22 of the box and upon which the flanged portion 42 of the pipe extension 31 is seated, are provided with openings or ports 24, which openings or ports are normally closed by means of caps or plates 43.

When it is desired to pass the gas through both beds of material, a suitable cap will be placed over the upper end of the pipe 31, and the plates or covers 43 will be removed and suitable plates or covers will be placed over the ports or openings 24 in the chamber 23. The inflowing gas therefore is delivered to the chamber 6 and is compelled to pass through two beds of purifying material, the said gas accumulating in the upper chamber 14 and passing thence through the outlet 8.

It will be obvious that changes may be made in the structure of my invention without departing from the spirit thereof, and I therefore reserve the right to make such changes as come within the scope of the appended claims.

Having described my invention, what I claim as new, and desire to secure by Letters Patent, is—

1. A gas-purifying box having two superimposed beds of purifying material, a central chamber between said beds, and chambers at the top and bottom of the box, an inlet-pipe entering the bottom of the box and opening into the central chamber, said inlet-pipe having ports or openings constructed to be closed, said ports when open communicating with the bottom chamber, and an outlet-pipe having communication with the top and bottom chamber.

2. A gas-purifying box having two superimposed beds of purifying material, a central chamber between said beds, and a chamber at the top and bottom of the box, an inlet-pipe entering the bottom of the box and terminating in the central chamber, said inlet-pipe having ports or openings constructed to be closed, said ports when open communicating with the bottom chamber, an outlet-pipe terminating at the upper chamber, and extending through the bottom of the box, said outlet-pipe having ports leading into the bottom chamber.

3. A gas-purifying box comprising a bottom box-section containing a bed of purifying material and having a lower chamber or space beneath said bed, said box-section having an annular chamber surrounding the same, a supplemental box-section also containing a bed of purifying material, said supplemental box-section being superimposed on the bottom box-section, a depending flange connected to the lower end of said supplemental section and seated in said annular chamber, an upper space or chamber above the bed of purifying material in the supplemental box-section, a single inlet connected to the bottom of the bottom box-section and constructed to deliver the gas either between the beds of purifying material or into the lower space or chamber, and a single outlet constructed to take the gas from either the top chamber or from both the top and the bottom chambers.

4. A gas-purifying box having two superimposed beds of purifying material, a central chamber between said beds, and chambers above and below said beds, a single inlet-pipe entering the bottom of the box and constructed to deliver the gas either into the central chamber or the bottom chamber, and a single outlet-pipe constructed to take the gas either from both the upper and bottom chambers or exclusively from the top chamber.

5. A gas-purifying box having two superimposed beds of purifying material, a central chamber between said beds, and separate chambers at the top and bottom of the box, an inlet-pipe entering the bottom of the box and opening into the center chamber, said inlet-pipe having that portion thereof which passes through the chamber at the bottom of the box of increased cross-sectional area, and provided with ports or openings communicating with the bottom chamber, means to close said ports and an outlet-pipe also entering the bottom of the box and terminating at the upper chamber, said outlet-pipe having that portion thereof which passes through the lower chamber of increased cross-sectional area and provided with ports communicating with the lower chamber, whereby the inlet-pipe has communication with both the upper and lower chambers.

In testimony whereof I have signed my name to this specification in the presence of two subscribing witnesses.

WALDO A. LEARNED.

Witnesses:
 LOUIS C. SMITH,
 GEO. W. GREGORY.